United States Patent [19]

Gluck

[11] 4,361,076
[45] Nov. 30, 1982

[54] VALVE ARRANGEMENT FOR SERVO-STEERING OF VEHICLES

[75] Inventor: Gunther Gluck, Spraitbach, Fed. Rep. of Germany

[73] Assignee: Zahnradfabrik Friedrichshafen, AG., Friedrichshafen, Fed. Rep. of Germany

[21] Appl. No.: 146,316

[22] Filed: May 5, 1980

[30] Foreign Application Priority Data

May 11, 1979 [DE] Fed. Rep. of Germany ....... 2919049

[51] Int. Cl.³ .................................................. F15B 9/10
[52] U.S. Cl. ................................. 91/422; 91/37 R; 180/148
[58] Field of Search ...................... 91/418, 422, 375 R, 91/416, 417 R, 376 R, 378; 180/148

[56] References Cited

U.S. PATENT DOCUMENTS

| 2,930,358 | 3/1960 | Folkerts | 91/378 |
|---|---|---|---|
| 2,936,739 | 5/1960 | Levenstein et al. | 91/378 |
| 3,037,485 | 6/1962 | Adams | 180/148 |
| 3,722,368 | 3/1973 | Suzuki | 91/422 |
| 3,722,369 | 3/1973 | Maekawa et al. | 91/422 |
| 3,896,702 | 7/1975 | Shah et al. | 91/375 A |
| 4,132,245 | 1/1979 | Johnson | 137/625.63 |
| 4,240,466 | 12/1980 | Herzon et al. | 137/614.04 |

FOREIGN PATENT DOCUMENTS

| 1137328 | 3/1964 | Fed. Rep. of Germany. |
|---|---|---|
| 2000377 | 12/1970 | Fed. Rep. of Germany. |
| 2747842 | 3/1978 | Fed. Rep. of Germany ........ 91/422 |

*Primary Examiner*—A. Michael Chambers
*Attorney, Agent, or Firm*—Zalkind & Shuster

[57] ABSTRACT

A distributor valve is reset to a neutral position relative to a piston valve in a servo-steering gear by rotational adjustment of a piston rod connected to the piston and extending through a non-rotatable rack externally of the housing enclosing the piston and the distributor valve. The distributor valve is locked in adjusted position at a location externally of the housing relative to one end of the rack to which it is threadedly connected internally of the housing.

5 Claims, 5 Drawing Figures

VALVE ARRANGEMENT FOR SERVO-STEERING OF VEHICLES

BACKGROUND OF THE INVENTION

This invention relates to a valve arrangement associated with a vehicle servo-steering mechanism of the rack and pinion type.

Servo-steering mechanisms of the foregoing type include a non-rotatable rack, a double acting piston and a piston rod attached to the piston and projecting externally of the housing within which the piston is reciprocably mounted. A distributing valve for controlling the supply and exhaust of pressurized fluid in response to axial movement of the rack, causes axial displacement of the piston.

A prestressed spring yieldably holds the distributor valve in a neutral position. Such a distributor valve arrangement in a servo-steering mechanism is already known, as disclosed for example in German Pat. No. AS 1137328. The double acting piston in such mechanism forms part of the distributing valve. However, the piston is disposed in symmetrical relation to the rack driving pinion so that two piston operating surfaces of equal size are exposed to pressurized fluid under control of a valve mechanism having a single intake from a pump and a single return port to the reservoir tank. One of the disadvantages of such an arrangement resides in the difficulty in maintaining a proper neutral setting for the distributor valve.

According to the disclosure in German Pat. No. OS 2,000,377 a valve arrangement for a vehicle servo-steering mechanism also includes a portion of the servomotor piston as part of the distributor valve. Unlike the disclosure in German Pat. No. AS 1137328 aforementioned, however, the latter patent features as a valve element that is displaced relative to the rack driving pinion, as a result of which two operating chambers associated with a piston exert a differential piston actuating force by virtue of opposite piston surfaces of different surface area. The latter arrangement, however, also suffers from the same problem aforementioned, namely difficulty in maintaining a proper neutral setting for the distributor valve.

It is therefore an important object of the present invention to provide a valve controlled servo-steering mechanism of the aforementioned type within which the problem of maintaining a proper neutral setting of the distributor valve is solved. A further object in accordance with the foregoing object is to provide a valve mechanism integrated in a rack type servo-steering a unit that is readily adjusted without disassembly to a neutral position from a location externally of the cylindrical housing enclosing the rack and valve piston.

SUMMARY OF THE INVENTION

In accordance with the present invention, a vehicle steering device is provided having a non-rotatable rack and a double acting piston enclosed within a cylindrical housing, the piston being attached to a piston rod which extends externally of the housing. A distributor valve includes a slide valve element threadedly connected to the rack and slidably received within a valve portion of the piston to control the supply and exhaust of pressurized fluid to opposed chambers on opposite axial sides of the piston in response to displacement of the distributor valve by the rack from its neutral position against the bias of a prestressed spring. Means for positionally adjusting the slide valve element relative to the rack is provided for resetting the valve to a proper neutral position. The positional adjustment is effected by a torque applied to the piston rod externally of the cylindrical housing.

In accordance with another aspect of the invention, the distributor valve is locked against positional adjustment by means of a disk splined to the axial end of the piston rod externally of the housing, the disk being releaseably connected by fasteners to an adjacent end of the rack.

BRIEF DESCRIPTION OF DRAWING FIGURES

A specific embodiment of the invention will be described in greater detail hereinafter with reference to the accompanying drawing, in which.

DETAILED DESCRIPTION OF PREFERRED EMBODIMENT

Figure 1:
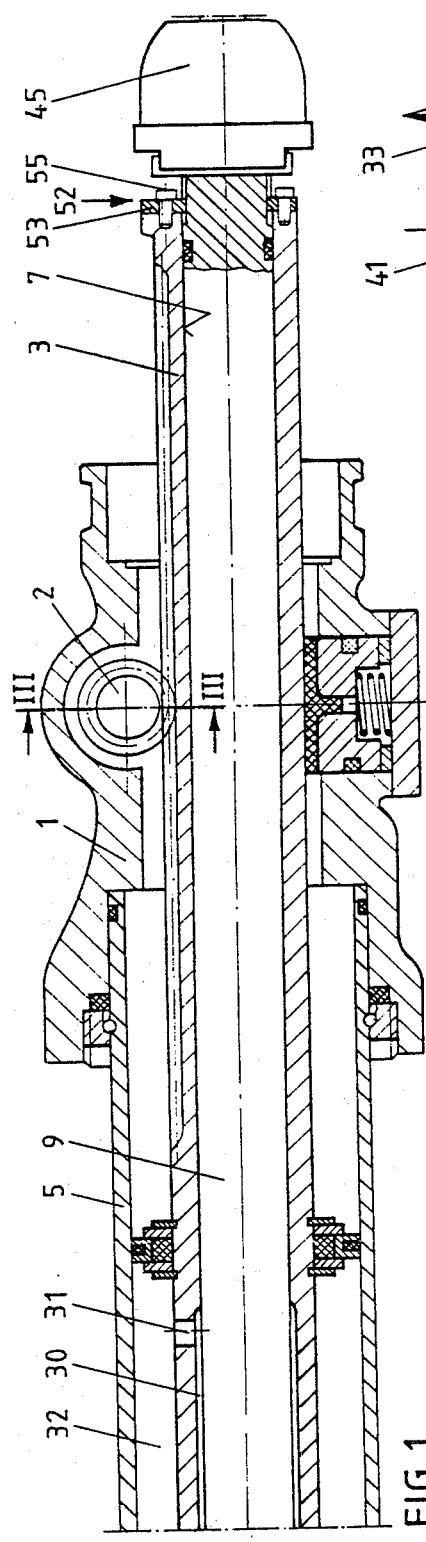
FIG. 1 is a partial longitudinal section view of a rack type servo-steering mechanism constructed in accordance with the present invention.
Figure 2:
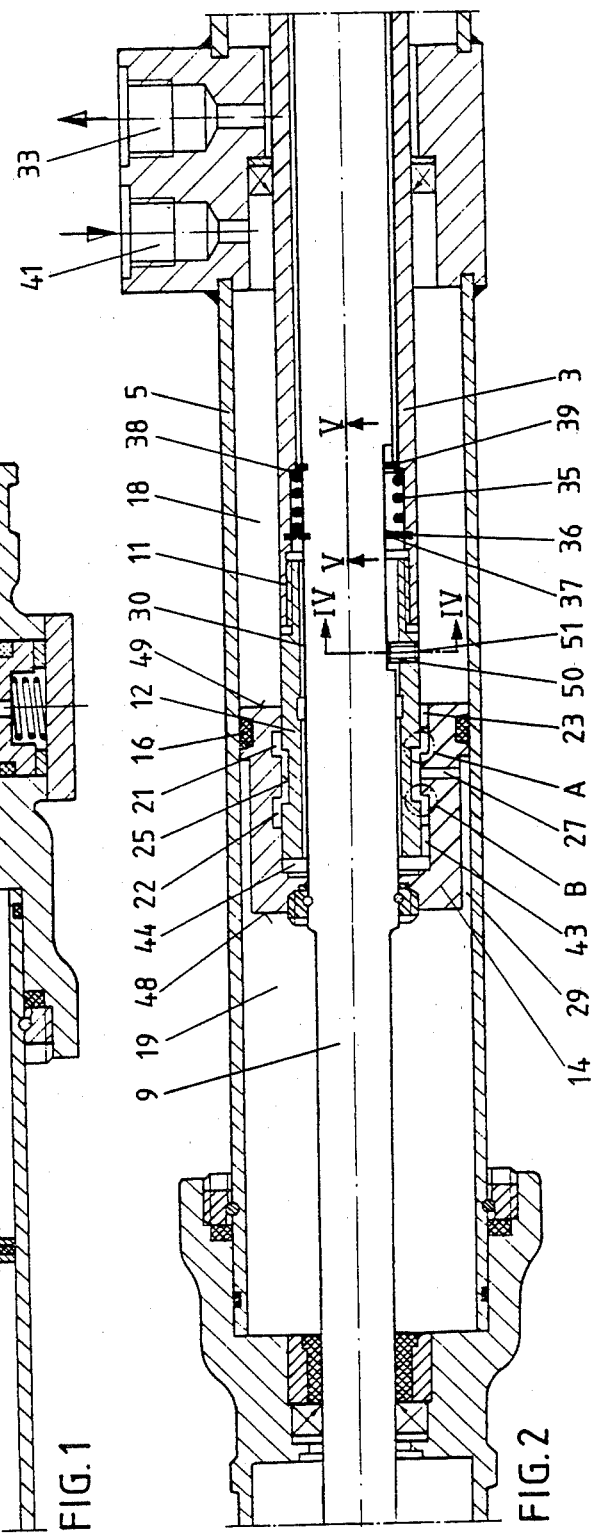
FIG. 2 is a partial longitudinal section view which is a continuation of the section view shown in FIG. 1, illustrating the rack type servo-steering mechanism.
Figure 3:
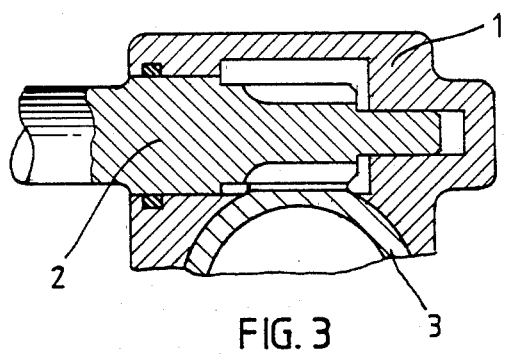
FIG. 3 is an enlarged partial section view taken substantially through a plane indicated by section line 3—3 in FIG. 1.

Referring now to the drawings in detail, FIGS. 1 and 2 illustrate a servo-steering gear assembly enclosed by an elongated cylindrical housing 5 connected at one axial end to a gear housing 1. The cylindrical housing 5 includes two sections interconnected by a ported body 4 intermediate opposite the axial ends of the cylindrical housing. A pinion 2 is rotatably mounted within the gear housing 1 as shown in FIG. 1 and is in meshing engagement with an axially elongated non-rotatable rack 3. A portion of the rack is located within the cylindrical housing 5 and has an internal bore 7 through which a continuous piston rod 9 extends. Rack teeth are formed on the rack 3 only in the region of the pinion 2. Except for the rack teeth portion of the rack 3, it is cylindrical in shape and is connected at one axial end to a distributor slide valve element 12 by means of a fine threaded connection 11 as shown in FIG. 2. The slidable valve element 12 is received within an operating piston 14 which is fixedly connected to the piston rod 9. The operating piston mounts an annular sealing gasket 16 in wiping contact with the internal surface of the cylindrical housing 5 to thereby separate two operating pressure chambers 18 and 19 within the cylindrical housing on opposite axial sides of the operating piston. Thus, the piston rod 9 is floatingly mounted by the piston 14 within the cylindrical housing 5.

The operating piston 14 is formed internally with valve grooves 21 and 22 whereby the operating chamber 18 is continuously in fluid communication through a recess 23 with the groove 21. The slide valve element 12 is externally formed with a groove 25 so that continuous fluid communication is established between the grooves 21 and 22 in the operating piston and the groove 25 for the neutral position of the distributor valve.

Communication between the operating chamber 19 and the groove 25 on the slide valve element 12, is established through a radial bore 27 in the operating piston, extending between the groove 25 and an annular passage 29 formed between the internal surface of the cylindrical housing 5 and the external surface of the piston 14. A valve control passage A is formed between the groove 21 and groove 25 while a valve control passage B is formed between the groove 25 and the groove 22 as denoted in FIG. 2.

Fluid communication is established through an internal bore 30 and radial bore 31 in the rack 3 between the distributor valve and a chamber 32 as shown in FIG. 1 in order to exhaust fluid through a return port 33 in the body 4 as shown in FIG. 2.

Figure 4:
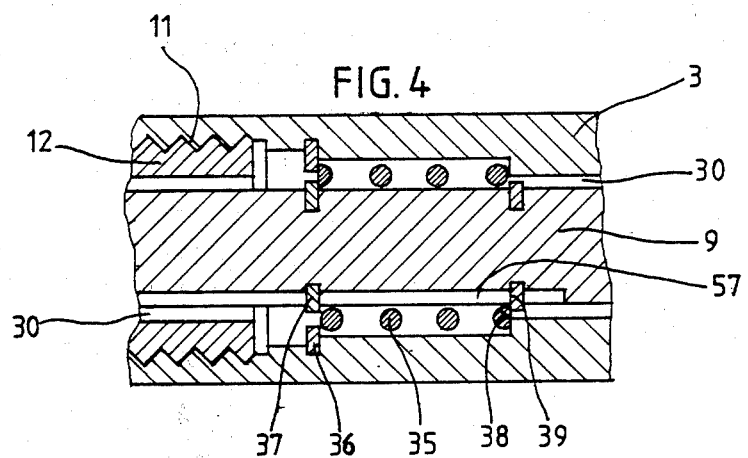
FIG. 4 is an enlarged partial section view taken substantially through a plane indicated by section line 4—4 in FIG. 2.
Figure 5:
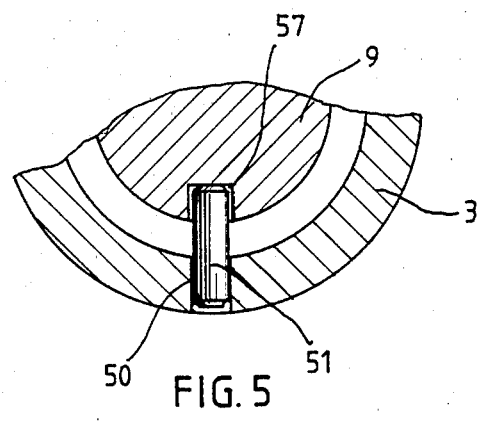
FIG. 5 is an enlarged partial section view taken substantially through a plane indicated by section line 5—5 in FIG. 2.

The neutral position of slide valve element 12 relative to the operating piston 14 is maintained by a spring 35 positioned with prestress between two pairs of stops 36, 37 and 38 and 39. The stops 36 and 38 are a disk and internal shoulder respectively fixed in axially spaced relation to the rack 3 while the stops 37 and 39 are disks fixed in axially spaced relation to the piston rod 9 as shown in FIG. 4. One axial end of spring 35 abuts stops 36 and 37, which are radially spaced from each other, while the other axial end abuts radially spaced stops 38 and 39. Thus, spring 35 will be axially compressed to yieldably resist any relative axial displacement between valve element 12 and piston rod 9 from the neutral position shown in FIGS. 2 and 4.

In the neutral position of the distributor valve, pressurized fluid from a pump is supplied through an inlet port 41 in the body 4 to the operating chamber 18 since the control passage A of the distributor valve is then open. Also, the operating chamber 19 is in fluid communication with operating chamber 18 in the neutral position of the distributor valve, through the radial bore 27. However, the control passage B of the distributor valve is also open in the neutral position so that the pressure fluid may flow through port 43 and passage 44 into the enlarged internal bore 30' of the valve element 12 aligned and in fluid communication with bore 30 of the rack 3 and then conducted to the return port 33 as aforementioned. The pressure fluid is therefore freely recirculated in the neutral position of the distributor valve to prevent any piston displacing pressure buildup.

In response to rotation of the hand steering wheel (not shown) causing rotation of the pinion 2, the rack 3 is displaced in a right-hand direction, for example, as viewed in FIGS. 1 and 2 to accordingly axially displace the slide valve element 12 through connection 11 in a right-hand direction against the bias of spring 35. As a result thereof, the control passage A of the distributor valve is closed causing a buildup of pressure of the fluid in the operating chamber 18 to axially displace the operating piston 14 and the piston rod 9 in a left-hand direction. Axial thrust is transmitted through ball pivots 45 at the opposite axial ends of the piston, one of which ball pivots is shown in FIG. 1. Displacement of the piston 14 by the pressurized fluid in chamber 18 causes expansion thereof and contraction of the chamber 19 from which fluid is displaced through the opened control passage B of the distributor valve to the return port 33 through the bore 30.

When turning movement is applied to pinion 2 by means of the usual hand wheel steering spindle in opposite directions the rack 3 is displaced in a left-hand direction with the slide valve element 12, for example, so that the control passage B of the distributor valve is closed and the pressure of the fluid within operating chamber 19 rises causing it to expand as fluid is introduced thereto through the open control passage A. The pressure of the fluid in the opposed chamber 18 also rises. However, since the fluid pressure in the operating chamber 19 is applied to a surface 48 of the piston 14 twice as large in area as that of the piston surface 49 exposed to fluid pressure in the operating chamber 18, a differential displacing force is exerted on the piston causing it to move in a right-hand direction.

In response to the release of the hand steering wheel connected to the steering spindle, the prestressed spring 35 causes the distributor valve to return to its neutral position. The bias of the prestressed spring 35 which holds the valve element 12 in the neutral position, must be high enough to effect a return of the dirigible wheels connected through steering linkages to the ends of the piston rod, to the straight-ahead position without shift of the distributor valve. The spring 35 also resists torque initially applied to the hand steering wheel before hydraulic power assist begins. As a result, sensing of steering load at the hand steering wheel will be possible even if the driver must apply a fraction of the torque to the hand steering wheel necessary to overcome the steering load.

In the event that hydraulic assist fails, the mechanical connection established by the steering gear assembly between the hand steering wheel and the dirigible wheels of the vehicle are still fully functional even if a greater amount of operating torque is required at the hand steering wheel.

In order to effect reset of the distributor valve to the neutral position, facilities for effecting positional adjustment of the slide valve element 12 is provided externally of the housing. Toward that end, an elongated opening 50 is formed in the slide valve element 12 as shown in FIG. 2 within which a driver element 51 is engaged. The driver element projects from a groove 57 formed in the piston rod 9. Thus, positional adjustment of the valve element 12 relative to the rack 3 to which it is connected by the threaded connection 11, may be effected by twisting the piston rod at a location externally of the housing relative to the rack 3 which is non-rotatably mounted within the housing. Rotation of the piston rod is operative through the driver element 51 to rotate the valve element 12 causing it to be screwed in or out relative to the rack 3 for positional adjustment purposes.

After positional adjustment of the valve element 12 relative to the rack 3 is effected, the piston rod is locked against adjustment twist by means of an angular locking arrangement 52 which includes a disk 53 splined to the piston rod adjacent the ball pivot 45 at the axial end of the piston rod as shown in FIG. 1. The disk 53 is releasably secured by fasteners 55 to the adjacent axial end of the rack 5. The disk 53 and fasteners 55 are readily accessible for lock releasing purposes externally of cylindrical housing 5 in order to enable one to make a desired positional adjustment of the distributor valve by torque applied to the piston rod 9 as aforementioned.

What is claimed is:

1. For use with a vehicle steering device having a non-rotatable rack (3), a double-acting piston (14), a housing (5) within which the piston is reciprocally mounted, and a piston rod (9) attached to and reciprocable with the piston extending externally of the housing, a distributor valve for controlling the supply of pressurized fluid to the housing in response to axial movement of the rack, including a slide valve element (12) operatively connected to the rack, valve passage means (21, 22, 44) formed in the piston in operative relation to the slide valve element, prestressed spring means (35) for yieldably holding the slide valve element in a neutral position relative to the piston, and means for adjusting the neutral position of the slide valve element relative to the rack by torque applied to the piston rod externally of the housing.

2. The combination as defined in claim 1 including a threaded connection (11) between the slide valve element and the rack, said adjusting means including a driver (50, 51) through which said torque is transmitted from the piston rod to the slide valve element causing axial displacement of the slide valve element relative to the rack, and releasable means (52) for preventing rotation of the piston rod relative to the rack to lock the slide valve element in an adjusted position.

3. The combination as defined in claim 2 wherein said releasable means comprises a disk (53) releasably secured to the rack externally of the housing and mounted in slidable, non-rotational relationship to the piston rod.

4. The combination as defined in claim 1 wherein said adjusting means includes a threaded connection (11) between the rack and the slide valve element, and means (50-51) responsive to rotation of the piston rod by said torque applied thereto externally of the housing for rotating the slide valve element causing axial adjustment thereof relative to the rack.

5. The combination as defined in claim 4 including lock means (52) engageable with the piston rod externally of the housing for preventing rotation thereof relative to the rack.

* * * * *